United States Patent Office 3,523,955
Patented Aug. 11, 1970

3,523,955
PROCESS FOR THE PREPARATION
OF ε-CAPROLACTONE
André Lantz, Oullins, and Francis Weiss, Pierre-Benite, France, assignors to Ugine Kuhlmann, Paris, France, a French company
No Drawing. Filed Jan. 24, 1967, Ser. No. 611,255
Claims priority, application France, Jan. 25, 1966,
47,034
Int. Cl. C07d 21/00
U.S. Cl. 260—343                                    7 Claims

ABSTRACT OF THE DISCLOSURE

ε-Caprolactone is prepared by heating ε-hydroxy-caproic acid or its monoester or polyester derivatives at a temperature between 150° and 350° C. and in the presence of boric acid or boric anhydride.

BACKGROUND OF THE INVENTION

Field of the invention

This invention relates to the preparation of ε-caprolactone from ε-hydroxycaproic acid and its derivatives.

Description of the prior art

ε-Caprolactone may be produced by the oxidation of cyclohexanone with organic peracids, such as peracetic, perbenzoic and trifluoroperacetic acids, This type of process generally gives good yields when the peracid used is in an anhydrous solution. The organic peracids, however, are expensive reagents particularly when they must be in an anhydrous solution. This type of process also produces a certain quantity of by-products due to solvolysis or polymerization of caprolactone. The by-proudcts are far-less valuable and oftentimes useless.

Different industrial processes are also used to oxidize cyclohexane and the like to produce products such as ε-hydroxycaproic acid derivatives, cyclohexanol and cyclohexanone. For example, the oxidation of cyclohexanone with mineral peracids and the transposition of cyclohexanol autoxidation products in mineral acids or formic acid produced satisfactory yields of ε-hydroxycaproic acid derivatives. These processes however, are less attractive because the ε-caprolactones that are formed simultaneously are unstable and only solvolysis or high molecular weight polymeriztaion products are obtained. The oxidation of cyclohexane to form cyclohexanol or cyclohexanone, has commercial significance. The processes used heretofore produced large quantities of by-products such as ε-hydroxycaproic acid and its polyesters, and were not able to produce ε-caprolactone.

SUMMARY OF THE INVENTION

We have now found that ε-hydroxycaproic acid and its derivatives produced in the prior processes may be converted simply and effectively to ε-caprolactone. According to the process of this invention, ε-caprolactones are prepared by heating ε-hydroxycaproic acid and its derivatives at a temperature in the range between 150° C. and 350° C. and in the presence of a boric catalyst selected from the group consisting of orthoboric acid, metaboric acid and boric anhydrides. Advantageously, the ε-caprolactone thus obtained is recovered by distillation under the reduced pressure.

The derivatives of ε-hydroxycaproic acid that are suitable as starting materials for the process of this invention, include esters of ε-hydroxycaproic acids such as methyl-ε-hydroxycaproate, acylated derivatives such as ε-formyloxycaproic acids and ε-acetoxycaproic acid, esters of said acylated derivatives and polyesters of said esters. Various acid fractions by-products from the process of producing cyclohexanol and cyclohexanone by the oxidation of cyclohexane with oxygen are also found to be eminently suitable. These fractions contain a mixture of ε-hydroxycaproic acid and polyesters of this acid.

The resultant product, ε-caprolactone, has many industrial applications. It is used, for example, as an intermediate for the preparation of high molecular weight resins and synthetic fibers. It is also noted for its capability to polymerize or copolymerize with other reactive compounds, such as epoxy.

DESCRIPTION OF THE PREFERRED EMBODIMENTS

In carrying out the process of this invention, the reaction mixture, which includes one or more ε-caprolactone and its derivatives and the boric catalyst, is heated in the temperature range between 150°–350° C. and preferably between 180°–280° C. The amount of boric catalyst required varies within a wide range of 0.1 to 30% by weight and preferably between 1 and 10% by weight of the starting ε-hydroxycaproic acid and its derivatives. The temperature is advantageously adjusted during the heating period according to the demand of the reaction. For example, when an ε-hydroxycaproic acid polyester is used as a starting material, a relatively low temperature is used when the initial reaction is rapid and thereafter the temperature is increased gradually to maintain an even distillation rate for the removal of ε-caprolactone thus formed. Similarly, when the starting material is ε-hydroxycaproic acid, an acyloxycaproic acid or an alkyl hydroxycaproate, the initial temperature is maintained at a relatively low level to remove water, carboxylic acid, alcohol or other by-products, and is raised to a higher level for the distillation of ε-caprolactone and to allow the reaction to proceed to the completion. Advantageously, this reaction temperature is such that it allows the selective distillation of the by-products. The subsequent reaction temperature should be sufficiently high to cause the depolymerization of the polyester formed during the initial period of the reaction.

The reaction is preferably conducted under a reduced pressure to permit rapid distillation of the reaction products, for example between 0.1 and 50 mm. Hg. The process may also be carried out in an inert gaseous atmosphere such as nitrogen or carbon dioxide.

When an alkyl ester of ε-hydroxycaproic acid or a polyester of this acid whose therminal function is an ester function of a lower-boiling monohydric alcohol is used as a starting material, part of the monohydric alcohol liberated during the reaction may react with boric acid to give a volatile boric ester, and hence the quantity of boric acid used has to be adjusted accordingly.

The conversion of ε-hydroxycaproic acid and its derivatives to ε-caprolactone in the presence of boric acid or boric anhydride using a few typical starting materials, can be represented by the following equations:

(A) The starting material is a polyester whose terminal OH and COOH functions are free:

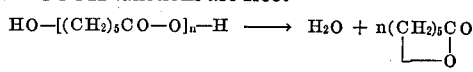

(B) The starting material is epsilon-hydroxycaproic acid

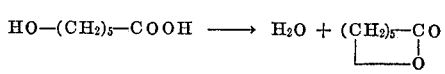

(C) The starting material is epsilon-formyloxycaproic acid:

(D) The starting material is methylepsilon-hydroxycaproate:

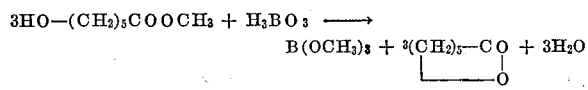

Further to illustrate this invention specific examples are described hereinbelow.

EXAMPLE 1

50 grams of an epsilon-hydroxycaproic acid polyester, which had a mean molecular weight of about 1800, and was obtained from oxidation of cyclohexanone with hydrogen peroxide in formic acid, was heated in a round flask with 1.6 grams of orthoboric acid (3.2% by weight, or 6 moles per 100 oxycaproic equivalents) for an hour and a half at 250°–270° C. After which the reaction mixture was heated for half an hour at 270–300° C. under a pressure of 0.1 to 1 mm. Hg to distill ε-caprolactone thus formed. 41 grams of crude epsilon-caprolactone was obtained which boiled at 65–75° C., under the pressure used. It had a titer of 96% according to gas chromatography. At the end of the run 8 grams of residue were remaining in the flask, consisting of boric acid and unconverted products. In terms of polyester involved, the rate of conversion into caprolactone reached 79%.

EXAMPLE 2

2.5 grams of orthoboric acid for 50 grams of polyester i.e., a proportion of 5% by weight, or 9 moles per 100 oxycaproic equivalents were employed for the conversion using the same conditions as set forth in Example I. During the same period of time, 38 grams of 94% caprolactone, corresponding to a conversion of 72% were recovered as distillate. Remaining in the flask was 13 grams of residue consisting of catalyst and unconverted products.

EXAMPLE 3

6.4 grams of orthoboric acid and 50 grams of polyester described in Example 1 were used for conversion in accordance with the conditions set forth in Example 1. 30 grams of 94% caprolactone corresponding to a conversion rate of 57%, were obtained.

EXAMPLE 4

50 grams of ε-formyloxycaproic acid were heated together with 2.5 grams of orthoboric acid under an initial pressure of 20 mm. of mercury. At a temperature of approximately 190° C., formic acid and water were liberated and were removed therefrom by distillation. A total of 14 grams of formic acid and water were collected. Thereafter the temperature was gradually raised to 250° C. and further to 300° C., while the pressure was reduced to 0.3 mm. Hg. 27 grams of 95% caprolactone were obtained, which corresponds to a conversion rate of 72% in terms of the amount of formyloxycaproic acid used.

EXAMPLE 5

43.5 grams of ε-acetoxycaproic acid were heated together with 2.2 grams of boric acid under the same conditions as set forth in Example 4. A first fraction containing 13 grams of acetic acid and a second fraction containing 20.5 grams of caprolactone were obtained.

EXAMPLE 6

40 grams of the same polyester as the one used in Example 1, and 2 grams of boric anhydride were heated for an hour at 250–270° C. and thereafter for an hour at 270°–300° C. 31 grams of caprolactone and 8 grams of residue were obtained.

EXAMPLE 7

48 grams of methyl ε-hydroxycaproate (0.33 mole) and 8 grams of boric acid (0.13 mole) were heated at 200°–230° C. and an initial pressure of 10 mm. Hg for 3 hours. During this period 14 grams of a fraction consisting principally of water, methanol and methyl borate were removed by distillation. The pressure was then reduced to 0.1 mm. Hg and the reaction temperature was raised to 250–280° C. 29 grams of crude 97% caprolactone (0.246 mole) and 12 grams of residue consisting of boric acid and polyesters were obtained.

We claim:

1. A process of preparing ε-caprolactone which consists essentially of heating at the temperature in the range between about 150° C. and 350° C. and in the presence of an acid boric catalyst selected from the group consisting of orthoboric acid, metaboric acid and boric anhydride, at least one of the following ε-hydroxycaproic acid derivatives, (a) ε-hydroxycaproic acid, (b) esters of (a), (c) acylated derivatives of (a), (d) esters of (c), and (e) polyesters derived from (a), (b), (c) and (d), said boric catalyst being present in an amount between about 0.1% to 30% by weight of said ε-hydroxycaprolactone acid derivatives, and distilling the thus formed ε-caprolactone from the reaction mixture.

2. A process according to claim 1 wherein the temperature range is between 180° and 280° C.

3. A process according to claim 1 wherein the process is carried out under reduced pressure.

4. A process according to claim 1 wherein the process is carried out in an inert atmosphere.

5. A process for preparing ε-caprolactone consisting essentially of heating at a temperature in the range between about 250° C. and 270° C. and in the presence of orthoboric acid or boric anhydride, an ε-hydroxycaproic acid polyester derived from the oxidation of cyclohexanone with hydrogen peroxide in formic acid, said boric acid or boric anhydride being present in the amount from about .1% to 30% by weight of said polyester, and removing the thus formed ε-caprolactones by distillation under a pressure of 0.1 mm. to 1 mm. Hg at a temperature in the range of 270°–300° C.

6. A process for preparing ε-caprolactone consisting essentially of heating, at a temperature in the range between 190° and 250° C. under a pressure of or about 20 mm. Hg, and in the presence of orthoboric acid or metaboric acid, ε-formyloxycaproic acid or acetoxycaproic acid, said boric acid or boric anhydride being present in the amount from about .1% to 30% by weight of said polyester, and distilling the reaction mixture at a temperature between 250° and 300° C. under a pressure of about 0.3 mm. Hg to recover the ε-caprolactone therefrom.

7. A process for preparing ε-caprolactone consisting essentially of heating, at a temperature in the range between 200°–230° C., under a pressure of about 10 mm. Hg and in the presence of orthoboric or metaboric acid, methyl epsilon-hydroxycaproate, said boric acid or boric anhydride being present in the amount from about .1% to 30% by weight of said polyester, and distilling under a pressure of about 0.1 mm. Hg at 250°–280° C. to recover the ε-caprolactone thus formed.

References Cited

UNITED STATES PATENTS 3,277,168 10/1966 Koening _____ 260—535
3,194,822 7/1965 Neiswender _____ 260—410.9
3,189,619 6/1965 Aldridge _____ 260—343

FOREIGN PATENTS 655,428 7/1951 Great Britain.

HENRY R. JILES, Primary Examiner
C. M. SHURKO, Assistant Examiner

U.S. Cl. X.R.

260—78.3, 462, 632, 541, 542